United States Patent [19]

Hillman

[11] 4,112,920

[45] Sep. 12, 1978

[54] SOLAR LIQUID/AIR HEATER

[76] Inventor: Edwin K. Hillman, 907 W. Desert Cove, Phoenix, Ariz. 85029

[21] Appl. No.: 714,917

[22] Filed: Aug. 16, 1976

[51] Int. Cl.² ............................. F24J 3/02; F24H 7/00
[52] U.S. Cl. ................................... 126/271; 237/1 A
[58] Field of Search ..................... 126/270, 271, 400; 237/1 A; 202/234, 136; 159/1 S; 203/DIG. 1; 202/218, 238; 196/112

[56] References Cited

U.S. PATENT DOCUMENTS

| | | | |
|---|---|---|---|
| 635,260 | 10/1899 | Larsen | 202/136 X |
| 2,247,830 | 7/1941 | Abbot | 126/271 |
| 3,200,051 | 8/1965 | Silvern | 202/238 X |
| 3,357,897 | 12/1967 | Salzer | 202/234 X |
| 3,363,618 | 1/1968 | Dominguez | 126/270 |
| 3,989,417 | 11/1976 | Neidigh | 60/641 X |

*Primary Examiner*—Kenneth W. Sprague
*Assistant Examiner*—Larry Jones

[57] ABSTRACT

Apparatus is disclosed for utilizing the energy of the sun to heat a rotatable round metal tank. The tank is cradled upon two sets of wheels, of which one set of wheels is powered by an electric motor. The tank is placed in horizontal position upon the two sets of wheels which are near ground level. The round metal tank is constructed with a divider/separator to form two separate compartments to hold or contain liquid and/or air. On the horizontal extremities of the round metal tank are outlet openings and inlet openings for the passage of liquid/air to move through the separate compartments. Adjacent and flanking the round metal tank are deflectors to concentrate Solar energy toward the round rotatable metal tank. Arcing over the round metal tank is a transparent cover to aid in the heat retention during and after the round tank is heated by Solar energy. The inlet openings and outlet openings are placed close to the divider/separator and also close to the peripheral area of the metal tank. The rotational movement of the round metal tank is powered by a small motor that turns one set of wheels in the direction that causes the separate compartment tank to "tilt" and this action causes the liquid to flow out of the compartment by the use of gravity into a container, this liquid then to be used by the user at his discretion by operating a pump.

12 Claims, 7 Drawing Figures

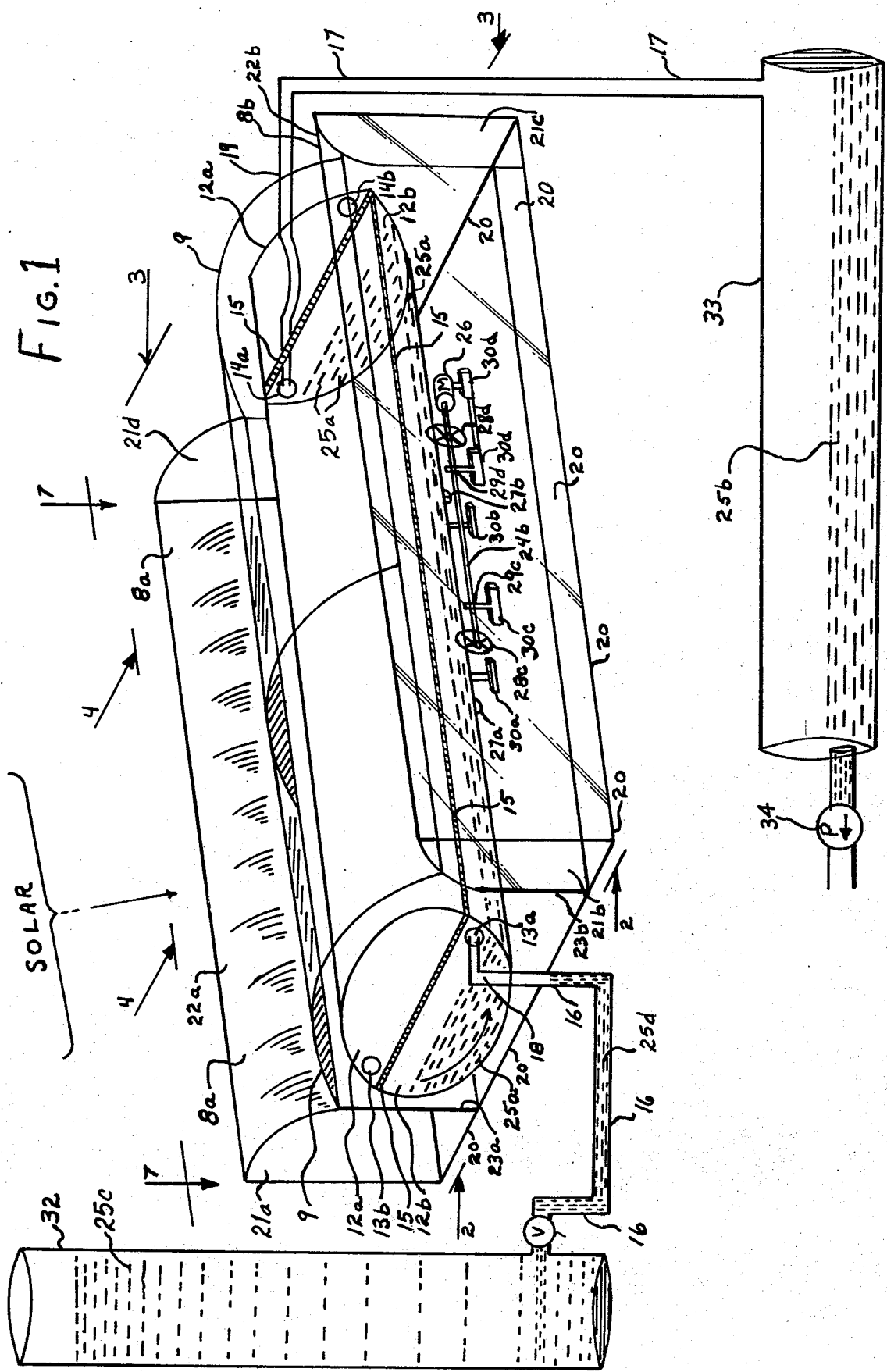

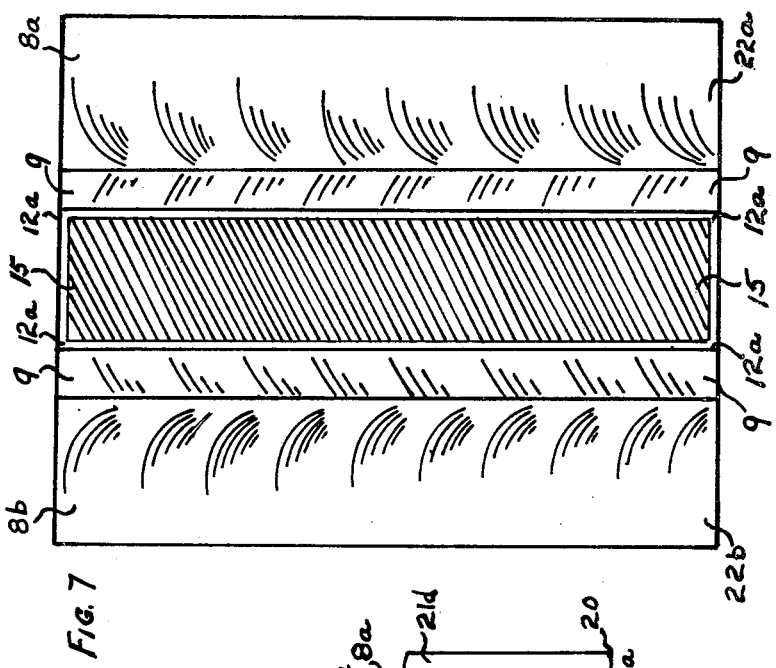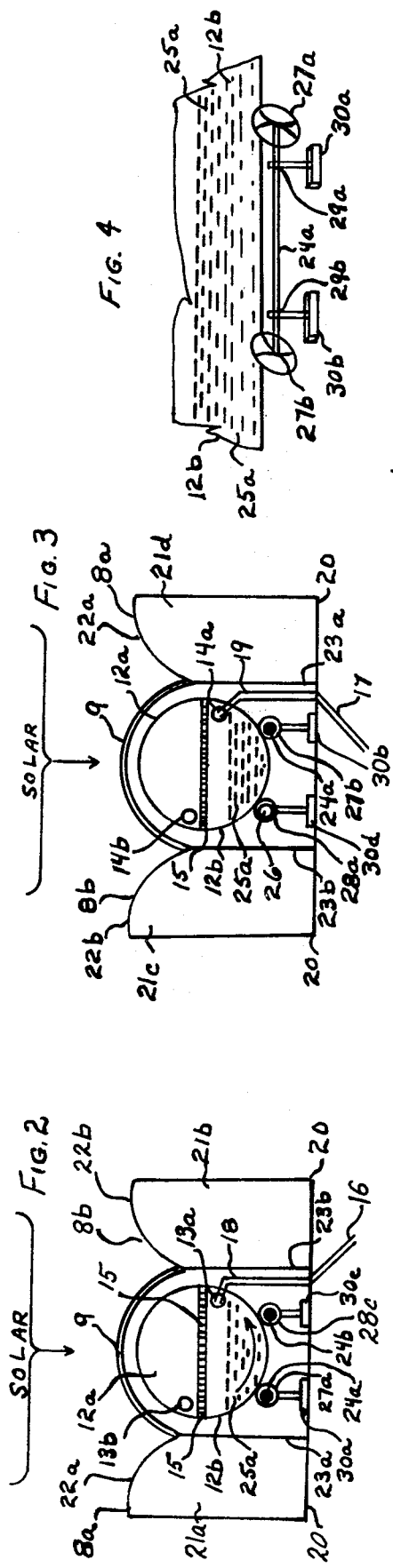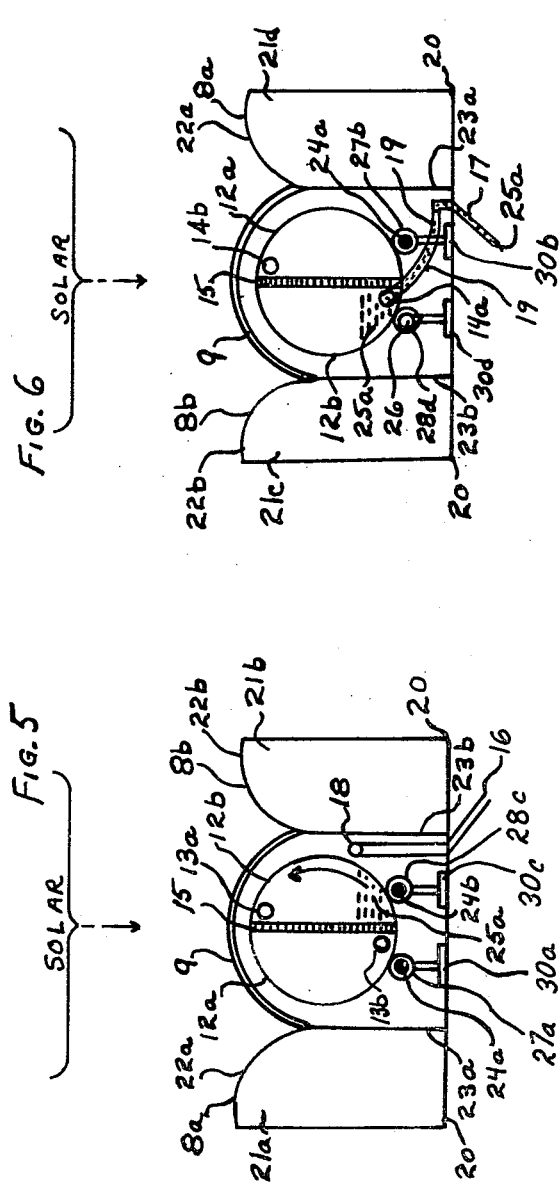

SOLAR LIQUID/AIR HEATER

The rotational movement of the tank places the heated metal in direct contact with liquid/air and thus performs the heat exchange as directed by the user by initiating the operation of the small electrical motor.

The present invention relates to apparatus for utilizing the energy of the sun, and more particularly, to apparatus presenting a varying surface area for exposure to Solar energy.

Various devices have been used for many years to utilize the energy available from the sun. One of the most common of these devices is that of a solar collector. Usually, the solar collector includes structures that collect or concentrate solar energy to heat water or air and have been generally described as flat plate or parabolic. These types are popular and in use to perform their stated functions.

Another type of a device for solar energy is the use of mirrors to concentrate solar energy on a given point. Devices such as this have been constructed with more experimentation expected. This type of operation also needs mechanisms that follow the sun for optimum performance.

Variations on the above discussed types of solar collectors have been also developed. However, each of these types of apparatus include non-varying surface area elements to the exposure of Solar energy.

It is therefore a primary object of the present invention to provide a variable surface area that is responsive to Solar energy for the purpose of heating liquid/air.

Another object of my invention is to provide a means for varying the area of the surfaces subjected to the energy of the sun as a function of the rotational position of the heater.

A yet another object of the present invention is to provide a means for the placement of the Solar liquid/air heater with respect to the position of the sun.

A still another object of the present invention is to provide means which rotates the solar liquid/air heater for the most efficient use.

A further object of the present invention is to provide deflectors which will aid the concentration of solar energy upon the Solar liquid/air heater.

A yet further object of the present invention is to provide a transparent cover arcing over the Solar liquid/air heater and joining at the deflectors.

A still further object of the present invention is to provide a divider/separator to divide and separate the Solar liquid/air heater into compartments.

These and other objects of the invention will become more readily apparent to those skilled in the art as the description thereof proceeds.

The present invention may be described with more specificity and clarity with reference to the following drawings, in which:

FIG. 1 illustrates an isometric view of the present invention;

FIG. 2 illustrates a cross-sectional view of the present invention, taken along lines 2—2 as shown in FIG. 1;

FIG. 3 illustrates a cross-sectional view of the present invention, taken along lines 3—3 as shown in FIG. 1;

FIG. 4 illustrates a sectional view of the present invention, taken along lines 4—4 as shown in FIG. 1 showing that portion of the tank being supported by stands, shaft, and wheels.

FIG. 5 illustrates a cross-sectional view of the present invention, taken along lines 2—2 but illustrating a varied position from illustration of FIG. 2;

FIG. 6 illustrates a cross-sectional view of the present invention, taken along lines 3—3 but illustrating a varied position from illustration of FIG. 3;

FIG. 7 illustrates a cross-sectional view of the present invention, taken along lines 7—7 and illustrates a top view of the deflectors, transparent cover, tank compartment and illustrating the length and width of the divider/separator.

In the following discussion describing the present invention, reference will be made to FIG. 1. The present invention is supported above the ground by a plurality of wheels, wheel 27a, wheel 27b, wheel 28c and wheel 28d. Wheel 28c and wheel 28d are secured to shaft 24b and shaft 24b rotates in bushing 29c and bushing 29d. Bushing 29c is part of stand 30c. Bushing 29d is part of stand 30d. The other set of wheels and their support will be discussed later in FIG. 4.

Base 20 which is comprised of sheet metal and angle iron forms a base to support side panel 21a, side panel 21b, side panel 21c and side panel 21d. Side panel 21a and side panel 21d support quarter round deflector 8a, which can be also made of sheet metal, and upon this quarter round deflector 8a is applied polished aluminum 22a. Side panel 21b and side panel 21c supports quarter round deflector 8b, which can be also made of sheet metal, and upon this quarter round deflector 8b is applied polished aluminum 22b.

Transparent cover 9 arcs over tank compartment 12a and transparent cover 9 extends over the full length of tank compartment 12a. Transparent cover 9 joins quarter round deflector 8a and quarter round deflector 8b at the joints of their respective valleys. Support 23a and support 23b will support the area where transparent cover 9 will join quarter round deflector 8b and quarter round deflector 8a in the valleys and support 23a and support 23b can also be constructed of sheet metal.

Tank compartment 12a and tank compartment 12b form a round metal tank and in this round metal tank, divider/separator 15 divides and separates the round metal tank into two compartments, which compartments, tank compartment 12a and tank compartment 12b extend throughout the length of the formed round metal tank. At one end of the round metal tank and associated with tank compartment 12b is inlet 13a. The other end of the round metal tank and associated with tank compartment 12b is outlet 14a. At one end of the round metal tank and associated with tank compartment 12a is inlet 13b. The other end of the round metal tank and associated with tank compartment 12a is outlet 14b. As illustrated in FIG. 1, an arrow illustrates the direction that tank compartment 12b will rotate as will be explained in later Figure drawings.

Liquid reservoir 32 is illustrated as having liquid 25c within the confines of liquid reservoir 32. Valve 31 controls the movement of liquid 25c and in FIG. 1 valve 31 is turned off. It will be assumed that in FIG. 1, liquid 25a has been allowed to enter tank compartment 12b through valve 31, through pipe 16, through flexible hose 18, through inlet 13a. Liquid 25d pertains to that portion of liquid that remains in pipe 16 after valve 31 is turned off. At this stage it will be assumed that tank compartment 12b was previously heated by Solar energy and as shown in FIG. 1, the process of heat exchange is taking place. As illustrated in FIG. 1, it also will be assumed that Solar energy is available to describe this invention with clarity.

Again referring to FIG. 1, flexible hose 19 is part of pipe 17 and flexible hose 19 is made of material that will accommodate a 90° movement. Pipe 17 extends downward and it is assumed for the purpose of discussion that pipe 17 extends downward toward liquid continer 33 and again it will be assumed that liquid container 33 is located beneath ground level. It is assumed that liquid 25b has been previously heated using the present invention and is now available to the user of this invention by activating pump 34 and directing the heated liquid 25b for the purposes he now desires.

Still referring to FIG. 1, the armature of electrical motor 26 is fixed to shaft 24b and shaft 24b is fixed to wheel 28c and wheel 28d. When electrical power is applied to electrical motor 26, it enables wheel 28c and wheel 28d to rotate. The movement of wheel 28c and wheel 28d, which act in unison, provide the power to cause the rotation of tank compartment 12b and tank compartment 12a. Shaft 24b rotates in bushing 29c and in bushing 29d.

In the following discussion and referring to all applicable Figures of drawings, I will describe the operation and basic modes of operation and further describe that the operation will be conducted manually for the purpose of clarity and understanding. Still referring to FIG. 1, it is to be understood that flexible hose 18 can be manuallly inserted in inlet 13a and manually removed from inlet 13a and the same manual procedure applies to flexible hose 19 with regard to outlet 14a. This method of describing with manual operations will aid in the discussion of this present invention but it is to be noted that any of the manual operations can easily be automated by the use of proper technology.

Reference now to FIG. 2, and further describing the present invention, tank compartment 12b, tank compartment 12a form a round metal tank, which round metal tank is supported by wheel 27a, shaft 24a and stand 30a, and also by wheel 28c, shaft 24b and stand 30c. Side panel 21a, side panel 21b, support 23b, support 23a are fixed to base 20. Liquid 25a is in direct contact with tank compartment 12b and it will be assumed that previous discussions are still revelant and applied where applicable to FIG. 2. Quarter round deflector 8a, quarter round deflector 8b with polished aluminum 22a and polished aluminum 22b deflect Solar energy toward tank compartment 12a with transparent cover 9 aiding in the retention of heat that has been directed toward tank compartment 12a. It is to be noted that divider/separator 15 is in a horizontal position and indirectly serves the function of retaining heat in tank compartment 12b. It is to be noted that flexible hose 18, which is an extention of pipe 16, is still inserted into inlet 13a. Inlet 13b is not in use for this cycle of heat exchange but inlet 13b will serve the same function that inlet 13a accomplishes in describing the present invention.

Further discussion in the present invention with reference to FIG. 3, side panel 21c, side panel 21d, support 23b, support 23a are fixed to base 20. Tank compartment 12b and tank compartment 12a form a round metal tank which is supported at near ground level by wheel 27b, shaft 24a, stand 30b and also by wheel 28d and stand 30d. In this drawing Figure electrical motor 26 is shown to line up with wheel 28d. Liquid 25a is also assumed to be heated by the process of heat exchange as liquid 25a is in direct contact with tank compartment 12b. Quarter round deflector 8b, quarter round deflector 8a with polished aluminum 22b and polished aluminum 22a deflect Solar energy toward tank compartment 12a with transparent cover 9 aiding in the retention of heat that has been directed toward tank compartment 12a. It is to be noted that divider/separator 15 is in a horizontal position and indirectly serves the function of retaining heat in tank compartment 12b. It is to be noted that flexible hose 19, which is an extention of pipe 17, is still inserted into outlet 14a. Flexible hose 19 has capabilities of a 90° "swing", this characteristic will be important in the discussion relating to FIG. 6. Outlet 14b is not in use for this cycle of heat exchange but outlet 14b will serve the same function that outlet 14a accomplishes in describing the present invention.

Further discussion and referring to FIG. 4, a sectional view shows the position of tank compartment 12b resting on wheel 27a and wheel 27b. Shaft 24a is fixed to wheel 27a and to wheel 27b and shaft 24a is journaled through bushing 29b and bushing 29a. Stand 30b and stand 30a support shaft 24a. Liquid 25a is confined to tank compartment 12b.

Further discussing the present invention with reference to FIG. 5, this illustration shows that a movement has taken place, more specifically that this rotation of tank compartment 12b and tank compartment 12a has been caused by electrical motor 26 (not shown in this drawing FIG. 5). Referring again to FIG. 5, it is to be noted that divider/separator 15 is now in a vertical position and flexible hose 18 has been manually removed from inlet 13a and this manual operation of removing flexible hose 18 was performed before electrical motor 26 (not shown in this drawing FIG. 5) was turned on.

Still referring to FIG. 5, side panel 21a, side panel 21b, support 23a, support 23b are fixed to base 20. Quarter round deflector 8a, quarter round deflector 8b with polished aluminum 22a and polished aluminum 22b deflects Solar energy toward tank compartment 12a and tank compartment 12b. Tank compartment 12a is in contact with wheel 27a and wheel 27a is supported by shaft 24a and stand 30a. Tank compartment 12b is supported by wheel 28c and wheel 28c is supported by shaft 24b and stand 30c. An important feature of this present invention is that inlet 13a serves the important function of being a "vent" for tank compartment 12b. This venting action of inlet 13a facilitates the drainage by gravity of liquid 25a which will be more fully explained in drawing FIG. 6. Again referring to FIG. 5, transparent cover 9 arcs over tank compartment 12a and tank compartment 12b. Inlet 13b will be the inlet used in the next cycle whereupon flexible hose 18 will be inserted into inlet 13b. Flexible hose 18, which is an extension of pipe 16, can be manually and with ease inserted and removed from inlet 13a and inlet 13b depending on the cycle that would be appropriate.

Further discussion and referring to FIG. 6 of the present invention, this illustration shows that a movement has taken place, more specifically that this rotation of tank compartment 12b and tank compartment 12a has been caused by electrical motor 26. Referring again to FIG. 6, it is to be noted that divider/separator 15 is now in a vertical position and flexible hose 19 has completed its "swing" and remained in contact with outlet 14a. It is also to be noted that liquid 25a is flowing through outlet 14a, through flexible hose 19, through pipe 17. Side panel 21c, side panel 21d, support 23b and support 23a are fixed to base 20. Tank compartment 12b is in contact with wheel 28d, which wheel 28d is supported by stand 30d. Tank compartment 12a is in contact with wheel 27b and wheel 27b is fixed to shaft 24a and stand 30b supports shaft 24a. Quarter round deflector 8a, quarter round deflector 8b with polished aluminum 22a and polished aluminum 22b deflects Solar energy toward tank compartment 12a and tank compartment 12b. Transparent cover 9 arcs over tank compartment 12a and tank compartment 12b. Outlet 14b will be the next liquid outlet in the next cycle when directed by the user of this invention. Keeping in mind that we are discussing those manual operations that have to do with the insertion and removal of flexible hose 19; when liquid 25a has completely drained from tank compartment 12b through outlet 14a, through flexible hose 19, through pipe 17, flexible hose 19 will then be manually removed from outlet 14a and be ready for insertion into outlet 14b at the proper time.

Again referring to the present invention and referring to FIG. 7, this drawing FIG. 7 shows the relationship of transparent cover 9 with quarter round deflector 8a, with its associated polished aluminum 22a, and also with quarter round deflector 8b with its associated polished aluminum 22b. This drawing FIG. 7 is important in that it illustrates that divider/separator 15 extends the full length and width of tank compartment 12a at its longest length and also its greatest width. Divider/separator 15 serves a very important function in that it facilitates the drainage of liquid/air that may be used with this present invention.

Having discussed all the drawing Figures pertaining to this present invention, it is to be understood that this present invention can also be very effectively used in the heating of air. Heating air with this invention would take slight modification of operation but the basic principles would remain. It should also be noted that divider/separator 15 can be constructed either of metal or of a non-metal composition. The decision for the construction of metal or non-metal will depend on whether the invention will be used for the heating of liquid or air. Generally if the invention is to be used for heating liquid, then divider/separator 15 should be constructed of non-metal and conversely divider/separator 15 should be constructed of metal for heating air.

In discussing the basic operation of this present invention most of my discussion will be in reference to FIG. 1. Assuming that Solar energy is available as shown in FIG. 1, I will describe what the inventor would do manually in conjunction with mechanical aspects of this invention. Again assuming that liquid 25a was stored in liquid reservoir 32, and that both tank compartment 12b and tank compartment 12a were emptied of their liquid into liquid container 33, the following assumption will be made. Tank compartment 12b was exposed to Solar energy and tank compartment 12b is hot enough to effectively heat liquid by the use of heat exchange. The inventor would activate electrical motor 26, causing tank compartment 12a and tank compartment 12b to rotate on wheel 28c, wheel 28d, wheel 27a and wheel 27b until tank compartment 12b is placed in the underside position relative to tank compartment 12a. The inventor then would insert flexible hose 18 into inlet 13a and also the inventor would attach flexible hose 19 into outlet 14a. Then the inventor would turn valve 31 "on" to allow liquid to flow through valve 31, through pipe 16, through flexible hose 18, through inlet 13a into tank compartment 12b to the desired amount of liquid 25a that would be appropriate with the heat content of tank compartment 12b. The inventor then would turn valve 31 "off" to shut off further liquid to tank compartment 12b.

The inventor would then allow sufficient time to lapse for the process of heat exchange to take place. After determining that liquid 25a was heated to its maximum heat range because of being in direct contact with the metal of tank compartment 12b, then the inventor would manually remove flexible hose 18 from inlet 13a. Electrical motor 26 would be activated slowly to start a "tilting" motion with respect to tank compartment 12b. Tank compartment 12b would "tilt" and rotate until the desired effect that is shown in FIG. 6. As previously discussed flexible hose 19 has accommodated the capabilities of a 90° 37 swing".

Now referring to FIG. 6, the inventor would manually remove flexible hose 19 from outlet 14a after all the liquid has drained out of tank compartment 12b and distributed as in previous discussion.

This present invention has the capabilities of conducting a heat exchange process (referring to FIG. 1), and more specifically, heat exchanges from tank compartment 12b to liquid 25a and simultaneously tank compartment 12a is being heated through Solar energy to prepare tank compartment 12a for the next rotation and consequently heat exchange that will result in an almost continuous heat exchange process.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

Having fully disclosed this present invention, I claim:

1. Apparatus for utilizing solar energy to heat a fluid, said apparatus comprising in combination:
   a. a rotatable tank for housing the fluid to be heated, said tank including first and second compartments defined by a tank divider element for alternately cyclically absorbing heat energy from the sun and transferring the absorbed energy to the fluid;
   b. means for cyclically rotating said tank to sequentially repetitively subject said first and second compartments to radiant energy from the sun and sequentially repetitively heat said first and second compartments;
   c. means for periodically introducing and withdrawing fluid from a heated one of said first and second compartments to effect a heat transfer from the heated one of said first and second compartments to the fluid;
   d. means for directing radiant energy from the sun to said tank; and
   e. means for reducing heat loss from said tank through convection;

whereby, a heated one of said first and second compartments transfers heat to a fluid temporarily introduced thereinto while the remaining one of said first and second compartments absorbs radiant heat from the sun preparatory to temporary introduction thereinto of fluid to be heated.

2. The apparatus as set forth in claim 1 wherein said tank is bisected into said first and second compartments.

3. The apparatus as set forth in claim 2 wherein said directing means comprises radiant energy reflecting surfaces.

4. The apparatus as set forth in claim 3 wherein said reducing means comprises a transparent element extending over said tank.

5. The apparatus as set forth in claim 4 wherein said tank is constructed of radiant energy absorbent material.

6. The apparatus as set forth in claim 5 wherein the fluid comprises water for domestic uses.

7. The apparatus as set forth in claim 6 including a source of water, a depository for water and pipe means for periodically interconnecting said tank between said source and said depository to provide heated water in said depository.

8. The apparatus as set forth in claim 7 wherein said tank comprises a closed end cylinder rotatable about its longitudinal axis and wherein said first and second compartments bisect said cylinder along the longitudinal axis of said cylinder.

9. The apparatus as set forth in claim 8 including support means for supporting said cylinder and rotating said cylinder about its longitudinal axis.

10. The apparatus as set forth in claim 9 wherein said reflecting surfaces extend longitudinally along opposed sides of said cylinder.

11. The apparatus as set forth in claim 10 wherein said transparent element extends over said cylinder intermediate said opposed reflecting surfaces.

12. The apparatus as set forth in claim 11 wherein said opposed reflecting surfaces are non-planar.

* * * * *